United States Patent [19]

Merton

[11] Patent Number: 4,899,392

[45] Date of Patent: Feb. 6, 1990

[54] METHOD AND SYSTEM FOR OBJECTIVELY GRADING AND IDENTIFYING COINS

[75] Inventor: Henry A. Merton, Saratoga Springs, N.Y.

[73] Assignee: Cing Corporation, Saratoga Springs, N.Y.

[21] Appl. No.: 128,494

[22] Filed: Dec. 3, 1987

[51] Int. Cl.[4] .......... G06K 9/00

[52] U.S. Cl. .......... 382/1; 356/371; 73/163; 194/302

[58] Field of Search .......... 194/302, 317; 73/163; 382/1; 358/107; 356/371

[56] References Cited

U.S. PATENT DOCUMENTS

| | | | |
|---|---|---|---|
| 3,349,612 | 10/1967 | Sherman | 73/163 |
| 3,728,795 | 4/1973 | Von Camber | 33/1 |
| 3,735,036 | 5/1973 | Macovski | 178/6.8 |
| 4,058,820 | 11/1977 | Hollen | 354/80 |
| 4,134,209 | 1/1979 | Fariss, Jr. | 33/1 |
| 4,191,472 | 3/1980 | Mason | 356/243 |
| 4,309,111 | 1/1982 | Sobresky, Sr. | 356/394 |
| 4,403,294 | 9/1983 | Hamada et al. | 364/507 |
| 4,493,411 | 1/1985 | Heiman | 194/100 |
| 4,513,441 | 4/1985 | Henshaw | 382/43 |
| 4,541,011 | 9/1985 | Mayer et al. | 358/106 |
| 4,550,433 | 10/1985 | Takahashi | 382/7 |
| 4,811,040 | 3/1989 | Madsen | 356/371 |

FOREIGN PATENT DOCUMENTS

| | | | |
|---|---|---|---|
| 3103371 | 8/1982 | Fed. Rep. of Germany | 73/163 |

OTHER PUBLICATIONS

American Numismatic Association, "Official A.N.A. Grading Standards for United States Coins", pp. 7–19, Revised Second Edition (1984).

Tracor Northern TN-8500 Image Analysis System brochure entitled "High Performance Image Analysis".

*Primary Examiner*—Leo H. Boudreau
*Assistant Examiner*—Jose L. Couso
*Attorney, Agent, or Firm*—Heslin & Rothenberg

[57] ABSTRACT

A method and system for accurately and objectively evaluating the numismatic quality of a test coin and/or for fingerprinting the test coin for purposes of identification is disclosed. Central to both the grading and fingerprinting aspects of the invention is the exact, numerical evaluation of any detracting marks on each side of the coin. In particular, each detracting mark on the coin is identified, located and measured. An assigned quantity representative of the detracting significance of each mark is then calculated by adjusting the measured surface area of the mark by a factor representative of the relative grading importance of the area on the coin where the mark is located. The assigned quantities and corresponding mark location identifiers are stored as a unique test coin fingerprint. The grading aspect further requires that the assigned quantities for each side be separately summed and correlated into a grade via comparison with a preexisting database of values representative of numismatic grades. Also, the method and system preferably include an automatic analysis of each coin side surface to determine a mint luster value, surface wear value, strength of strike indication, and whether artificial treatment of the coin has occurred.

57 Claims, 12 Drawing Sheets

FIG. 1B
UNITED STATES OF AMERICA
E PLURIBUS UNUM
ONE
DOLLAR
PEACE
16
16'
16"
12
11

FIG. 4
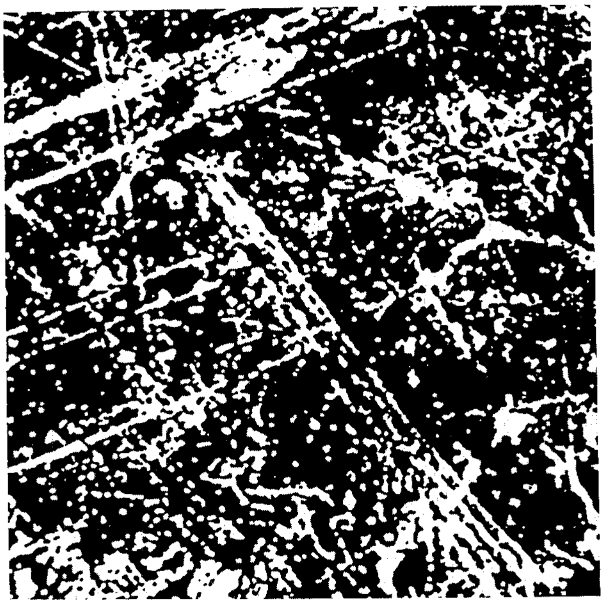
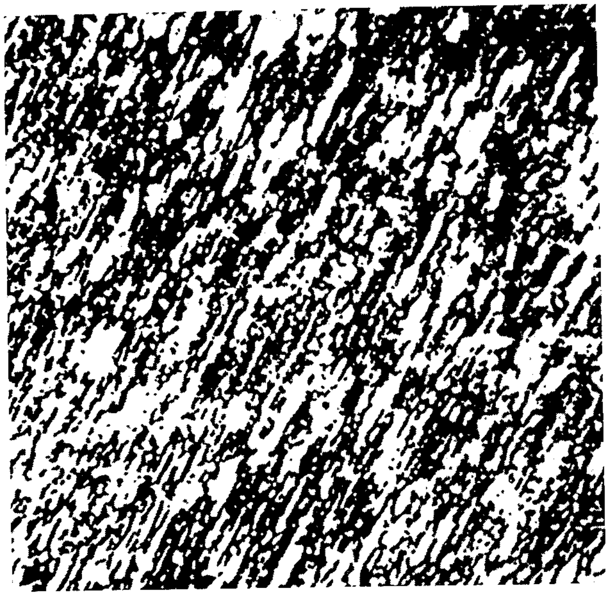
FIG. 5A

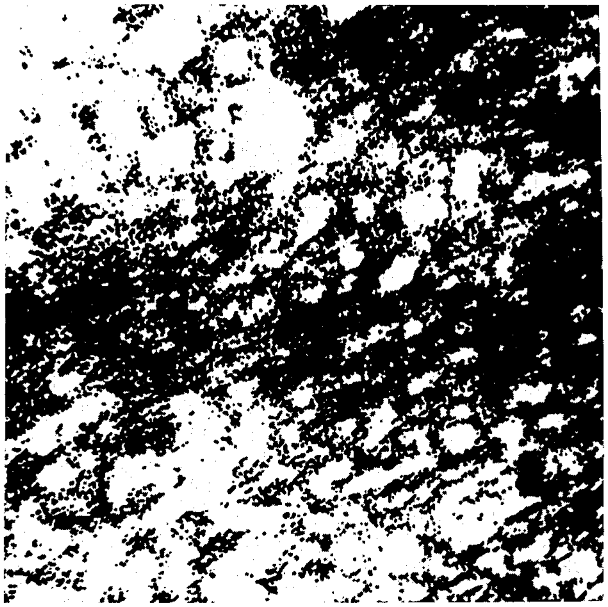
FIG. 6
FIG. 7
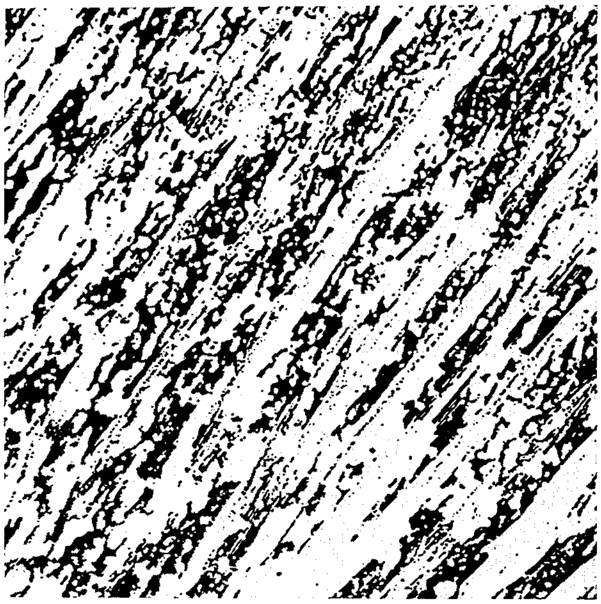

FUNCTIONAL SYSTEM OVERVIEW

METHOD AND SYSTEM FOR OBJECTIVELY GRADING AND IDENTIFYING COINS

BACKGROUND OF THE INVENTION

1. Technical Field

This invention relates in general to coin grading, and more particularly, to a method and system for accurately and objectively evaluating the numismatic quality of a coin and/or for identifying the coin.

2. Definitions

The following terms and phrases are used herein in accordance with the following meanings:

1. Coins—collectible pieces, including metallic money, tokens, medals, medallions, rounds, etc.

2. Obverse/Reverse—obverse is the side of the coin bearing the more important legends or types; its opposite side is the reverse.

3. Circulated/Uncirculated—circulation is the act of transferring a coin from place to place or person to person in the normal course of business; uncirculated is interchangable with "mint state" and refers to a coin which has never been circulated.

4. Detracting Marks—marks on a coin which have occurred after minting, for example: (a) bag marks, i.e., any nick, small cut or similar mark on the surface of a coin resulting from coins contacting each other within mint bags, while in storage at the Treasury Department or bank vaults, or during transportation prior to circulation; (b) scratch/gouge marks, i.e., grooves or other markings on a coin surface resulting from careless handling; and (c) friction wear, e.g., cabinet wear, pocket wear, etc., if visible to the naked eye or under small magnification, such as 2× or 4× magnification.

5. Macroscopic/Microscopic—macroscopic markings are visible to the naked eye; microscopic markings require a microscope to be viewed.

6. Mint Luster—the sheen or "bloom" on the surface of a coin created by radial die marks, which are produced by minute imperfections or rough spots on the surface of the dies used to form the coin and by the centrifugal flow of metal when struck by those dies.

7. Tampering—treating or processing a coin to give it the appearance of being of a higher grade than it actually is. Types of processing include: polishing or abrasion, which remove metal from a coin surface; etching, and acid treatment; "whizzing"; etc. Whizzing usually refers to abrating the surface of a coin with a wire brush to produce a series of minute, tiny parallel scratches which to the unaided eye or under low magnification often appear to be like mint luster.

8. Strength of Strike—refers to the sharpness of design details within a coin. A sharp strike or strong strike is one with all the details struck very clearly; a weak strike has the details lightly impressed at the time of coining.

3. Description of Prior Art

Although people have been collecting coins since the days of antiquity, it is only in recent times that coin values have greatly increased. One of the main determining factors of a coin's value is its grade, i.e., the condition or state of wear of the coin. A very small difference in grade can mean a large difference in price, thus making the exact grade of a coin important, especially today.

At present, two coin grading systems are prevalent. One expresses a coin's state in words or letters, the other uses a combination of letters and numbers. In the first system, the most important terms in ascending order are: good (G); very good (VG); fine (F); very fine (VF); extremely fine (EF), (XF); about uncirculated (AU); uncirculated or mint state (MS). The second system is based on an alphanumerical scale in which 1 represents the worst possible condition of preservation of a coin and 70 represents the best possible condition. In this system, a coin in uncirculated condition or mint state is referred to or categorized as an MS60 through MS70 coin.

The monetary value of a coin does not increase linerally as the coin advances within the different levels or categories of coin grades. As much as 95% of the potential monetary value of a coin may rest in being classified as an "uncirculated" (MS60 through MS70), or at least as an "about uncirculated" (AU50 through AU59) coin. In fact, the difference between one or two grade levels within these classes and particularly for mint state coins, may affect the value of a coin anywhere from hundreds to thousands of dollars.

Traditionally, a main difficulty inherent in classifying a coin within one of the above categories has been in defining what exactly is meant by the term designating a particular category. More obvious, however, has been the difficulty inherent in matching a particular test coin with one of the predefined grade categories since all grading to date has at least in part involved a subjective evaluation(s) by an appraiser or numismatist.

Known methods for defining what is meant by a particular grade category comprise either the use of textual descriptions, lined drawings, photographs or facsimile coins. With each of these methods, the category to which a coin is assigned ultimately depends to a large extent upon the numismatist conducting the evaluation. For example, textual descriptions of categories are susceptible to different interpretations by different individuals. Lined drawings often do not accurately represent the characteristics of actual coins and are normally utilized only to represent one particular type of defect or imperfection. Photographs and facsimile coins are often representative of a combination of types of defects which should be considered in evaluating coins, such as a photograph or facsimile coin illustrating visible wear and numerous bag marks. Clearly, such a guide provides a difficult standard and one which is open to various interpretations, especially, e.g., should no wear be visible but bag marks present on the test coin under evaluation.

Further, even if the grading system categories are understood by an individual, most, if not all, prior art methods of evaluating coins require the numismatist to subjectively match a particular test coin with a grade category. The principal factors to an accurate prior art appraisal of a coin are the appraiser's skill and experience, the lack of which can result in a particular coin being categorized significantly different than its true grade. However, even with an experienced appraiser, a particular coin may be categorized differently based upon environmental factors such as, the time of day, the presence or absence of magnification, and the type and amount of lighting applied to the surface of the coin.

The problems inherent in subjective grading methods have been highlighted and intensifed by the recent expansion of the number of grade system categories being used, e.g., from three or four previously used uncirculated categories to the eleven (MS60 through MS70) now used by some appraisers. A commonly heard complaint in the grading industry is that it is simply impossible to consistently and accurately categorize a coin with such a large number of grade levels. In response to this, at least one grading firm is requiring that each submission be evaluated by five recognized numismatists and that four of the five independently agree as to the grade category of the coin. Although such a program does result in a more accurate grading of coins, it is obviously a very costly and time consuming operation.

Another approach to addressing the subjectiveness problems of today's coin grading techniques is disclosed by Mason in U.S. Pat. No. 4,191,472. In Mason, apparatus is provided to assist an individual in evaluating some of the more important factors which influence the grade of a coin. This apparatus comprises sets of facsimile coins, for a given class or issue, representative of particular types of coin defects or imperfections. The facsimile coins within each set are arranged according to increasing or decreasing extents to which the coin defect is exhibited. Each of the facsimile coins has assigned to it a number representative of the relative value thereof based upon the extent to which the facsimile exhibits the particular coin defect. The numeric values of the facsimile coins which exhibit the defects to the same extent (roughly) as a test coin are noted and summed to arrive at a total numeric value for the coin. The monetary value or grade of the test coin is then determined with reference to tables which correlate the total numeric value of the test coin to a monetary value.

Although it is claimed in Mason that the described apparatus allows for the "objective" evaluation of coins, a subjective interpretation of the various facsimile coin definitions and matching of a test coin to a parcticular definition is still required. Mason simply assists the appraiser by directing his attention to some of the individual factors which comprise the various grade levels. Further, Mason only provides for consideration of selected factors such as bag marks, and coin luster, and does not address equally important considerations such as the location of the bag marks on the surface of the coin.

An issue closely related to coin grading involves the identification of lost or stolen coins. The importance of "fingerprinting" collectable coins for future identification is also of greater importance today as the value of such coins has increased. Presently, a coin is traced and identified via stored photographs of the coin, which are typically taken at the time the coin is graded. This procedure is sufficiently accurate, yet it is very time consuming to initially record the coins and then to subsequently search through a large number of coin photographs to identify a particular coin, much too time consuming to undertake with each coin being graded, at least not without first having a suspicion that a particular coin has been previously reported as lost or stolen.

Therefore, there presently exists a genuine need for an accurate and fully objective system for categorizing a coin at an appropriate grade level and for "fingerprinting" coins for recordation and subsequent comparison with other coins.

SUMMARY OF THE INVENTION

As more fully described herein, one aspect of the present invention comprises a method and system for truly objectively assigning a numismatic grade to a test coin. The method includes the steps of: identifying and locating each detracting mark on one of the obverse and reverse sides to the test coin; measuring the surface area of each identified detracting mark; assigning to each identified detracting mark a quantity proportional to the detracting significance thereof based upon the location and measured surface area of the mark on the selected side of the test coin; summing the assigned quantities to arrive at an amount representative of all of the detracting marks on the selected test coin side; and correlating, with reference to a preexisting scaled database of values representative of numismatic grades, the summed amount into a numismatic grade for the selected side of the test coin. The steps are then repeated for the opposite side of the test coin.

In the system, macroscopic imaging means for identifying and locating each detracting mark on each of the obverse and reverse sides of the test coin is provided. Also provided is first means for computing the surface area of each identified mark and for assigning a quantity representative of the detracting significance of each mark based upon its location on either of the obverse or reverse sides of the test coin and its measured surface area. Lastly, the system includes second means for summing the quantities assigned to the marks identified on each of the obverse and reverse sides of the coin and for translating the summed amounts into numismatic grades for the test coin sides.

A further embodiment of the invention comprises a method for accurately and objectively identifying coins. This method includes the steps of: identifying and locating each detracting mark on both the obverse and reverse sides of the test coin; measuring the surface area of each identified detracting mark; comparing the location and surface area of each detracting mark on the test coin with a preexisting database of coin identifying, detracting mark location and surface area information; and providing an indication when at least part of the test coin detracting mark location and surface area information matches all such information in the coin identifying database for a particular, previously recorded coin, thereby indicating identity of the test coin and the particular coin.

Accordingly, a principal object of the present invention is to provide a method and system for truly objectively assigning a numismatic grade to a test coin.

Another object of the present invention is to provide such a method and system which consistently and accurately assigns an exact numismatic grade to a test coin.

Yet another object of the present invention is to provide a method and system which is capable of being used to objectively fingerprint or identify said coin.

A further object of the present invention is to provide a method and system for detecting and quantifying macroscopic and microscopic imperfections on the surfaces of a test coin.

A still further object of the present invention is to provide a method and system for detecting if a coin has been artificially treated.

A but further object of the present invention is to provide such a method and system for grading and/or identifying coins that is faster and less expensive to operate than heretofore known systems.

Still another object of the present invention is to provide a method and system for accurately grading and/or identifing coins which requires a minimal number of skilled employees to practice or operate.

Yet still another object of the present invention is to provide a method and system for quantifying mint luster on the surfaces of a coin.

But still another object of the present invention is to provide a method and system for objectively evaluating the strength of strike of the surfaces of a coin.

BRIEF DESCRIPTION OF THE DRAWINGS

These and other objects, advantages and features of the present invention will be more readily understood from the following detailed description, when considered in conjunction with the accompanying drawings in which:

FIG. 4 is a representation of a magnified portion of the relief of a test coin exhibiting surface wear;

FIG. 5A is a representation of a magnified section of the surface of a test coin having a relatively high mint luster;

FIG. 6 is a representation of a magnified section of a test coin artificially treated by dipping;

FIG. 7 is a representation of a magnified section of a test coin artificially treated by whizzing;

DETAILED DESCRIPTION OF THE INVENTION

Figure 1A:
FIG. 1A is a representation of the obverse side of a test coin to be graded.

As briefly discussed above and more fully described below, the present invention consists of a system or method, and implementing apparatus, to objectively assign a numismatic grade to a coin (hereinafter referred to as the "test coin"), and/or to objectively and accurately "fingerprint" the test coin for purposes of identification, e.g., through comparison of said test coin fingerprint with the fingerprints of previously recorded coins of the same issue. Central to the objective methods of this invention is the exact, numerical evaluation of various test coin characteristics or features. Image analysis is believed preferable for such evaluation.

The test coin characteristic most important to objective grading and fingerprinting pursuant to of this invention is the presence of detracting marks on either, or both, of the obverse and reverse side surfaces of the coin. Specifically, each detracting mark on the test coin is identified, located and measured. An "assigned quantity" representative of the detracting significance of each mark is then calculated by adjusting the measured surface area of the mark by a factor representative of the relative grading importance of the particular area of the coin where the mark is located. Surface area measurements and locating of detracting marks are preferably determined to fairly exact standards or units. Because of the exactness of the measurements, an accurate "fingerprint" of the coin is provided by said surface area and location information for the detracting marks on each coin side. The identifying function of the invention is accomplished by comparing the test coin's fingerprint with a preexisting database of coin identifying information comprising fingerprints of all previously recorded coins of the same issue. When a match is found, an indication is provided that the test coin has been previously fingerprinted, and if pertinent, that the coin has been flagged as lost or stolen.

The objective grading aspect of the present invention further requires that detracting mark assigned quantities for each side of the test coin be seperately summed and correlated into a grade via comparison with a preexisting database of values representative of numismatic grades. This database of values is preferably initially generated as described below.

In addition to evaluating or grading the test coin based upon the presence of detracting marks, the system preferably includes an analysis of each coin side surface to determine a mint luster value, surface wear value, strength of strike indication, and whether artificial treatment of the coin has occurred. Each of these evaluations again relies upon quantification of the specific characteristic under consideration and comparison of the test coin measurement(s) with preexisting databases of such information.

The coin grading and identification concept of the present invention, i.e., based on converting various features of the coin into mathematical records for analysis, is applicable to all qualities of coins, both circulated and uncirculated. However, because of the wider popularity and value associated with uncirculated or mint state coins, the example and detailed embodiment provided herein will essentially be based upon the uncirculated grade categories, i.e., MS60 through MS70, along with some discussion of the almost uncirculated grade categories, i.e., AU50 through AU59.

Figure 1B:
FIG. 1B is a representation of the reverse side of the test coin to be graded.

With reference to the drawings, the implementation and operation of one preferred emobdiment of the method or system will be described. FIGS. 1A and 1B show the obverse 10 and reverse 12 sides, respectively, of a sample test coin 11 to be objectively graded and fingerprinted pursuant to the invention. Test coin 11 is a representation of a 1922 Peace Dollar which is marred by several detracting marks 14, 14', 14" and 16, 16', 16" on the obverse 10 and reverse 12 sides, respectively, of the coin. Mark 15 on the obverse side 10 of coin 11 represents the coin designer's signature and is therefore not a detracting mark.

Figure 2:
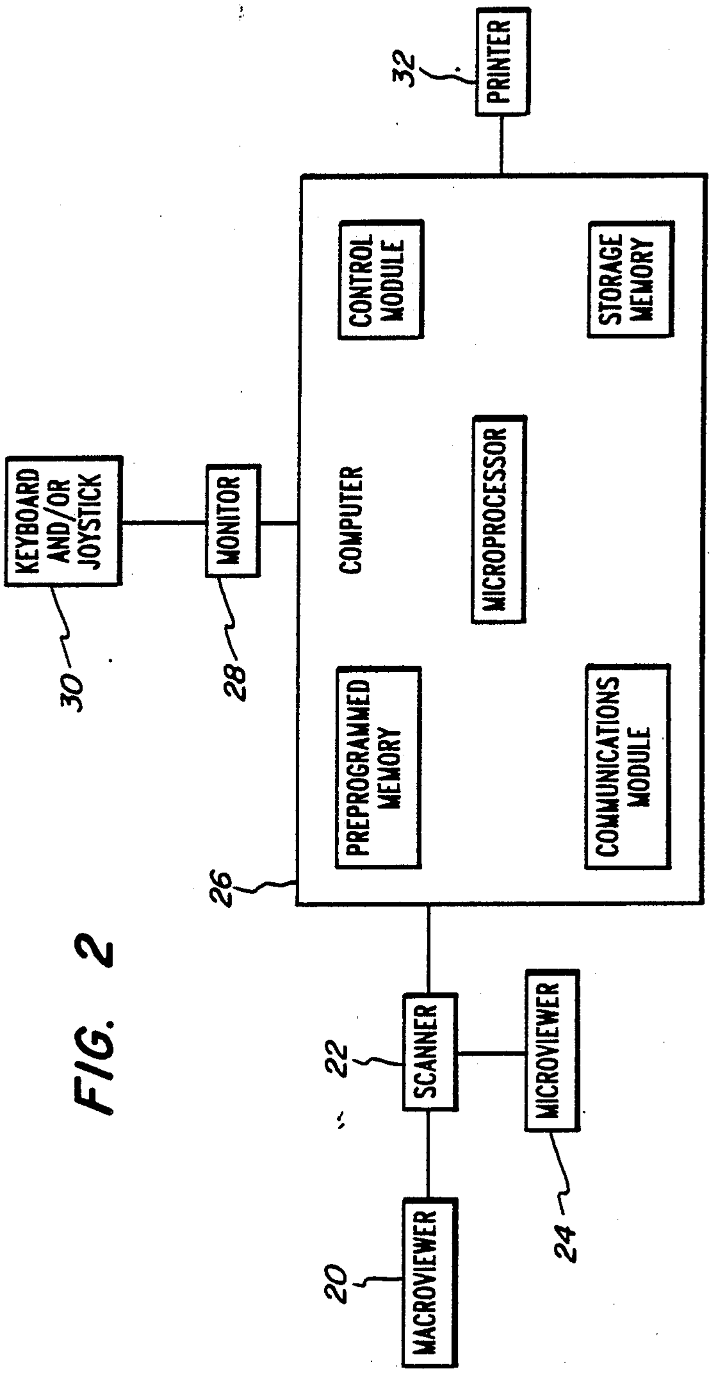
FIG. 2 is a block diagram representation of one preferred image analysis system useful in implementing the present invention.

As noted above, in one preferred embodiment, image analysis is utilized to objectively grade test coin 11. A block diagram representation of such an image analysis system 17 is shown in FIG. 2. System 17 includes a macroviewer 20 for forming an optical image of the surface of either the obverse or reverse side of test coin 11, or of a photograph of the obverse or reverse side of the coin. The macroscopic image outputted from viewer 20 is relayed to a scanner 22 which converts the image into a video signal capable of being analyzed by a computer. A microviewer 24 is also included within system 17 for detailed, high powered examination of one or both of the coin side surfaces. Microviewer 24 essentially comprises a high quality microscope combined with commercially available automatic stage and auto focus accessories. As with macroviewer 20, optical images from microviewer 24 are fed to scanner 22 for conversion into computer readable video signals. A computer 26 receives the video signals from scanner 22 for analysis.

Computer 26 includes a microprocessor, pre-programmed memory, control and communication modules, and storage memory. If desired, signals from scanner 22 can be simultaneously fed to a monitor screen 28 for operator viewing. If so, a keyboard and/or joystick 30 is preferrably included to allow interaction between system 17 and an operator. A hard copy printout of the grading and/or identification results is provided via a printer 32. One such image analysis system 17 useful for the implementation of the present invention is manufactured by Artek Systems of Rochester, N.Y., and commercially sold under the trademark "OMNICON 5000". A second such image analysis system 17, believed preferable for the present invention, is manufactured by Tracor Northern of Marlton, N.J., and commercially sold under the name "TN-8500 Image Analysis System".

It will be apparent to those skilled in the art from the following discussion that other types of imaging hardware and/or systems may be utilized in implementing the present invention. For example, scanning electron microscopes, energy dispersive spectrophotometers, VCRs, laser scanners, holography, interferometry and image subtraction are a few of the alternate, presently available types of equipment technologies which may be used.

Prior to objectively grading and/or fingerprinting test coin 11, certain reference databases must be established and programmed into computer 26 of system 17. As mentioned above, the most important database comprises a scaled database of quantified values correlated with numismatic grades (hereinafter sometimes referred to as the "first reference database"). Additional reference information, preferably compiled in separate databases, includes data on surface wear, mint luster, strength of strike and types of artificial coin treatment (hereinafter sometimes referred to as the "second reference database," "third reference database," "fourth reference database," and "fifth reference database", respectively). The content and compilation of each of these databases is described in detail below. It is contemplated that separate databases of such information shall be provided for each coin issue to be objectively graded.

Figure 3:
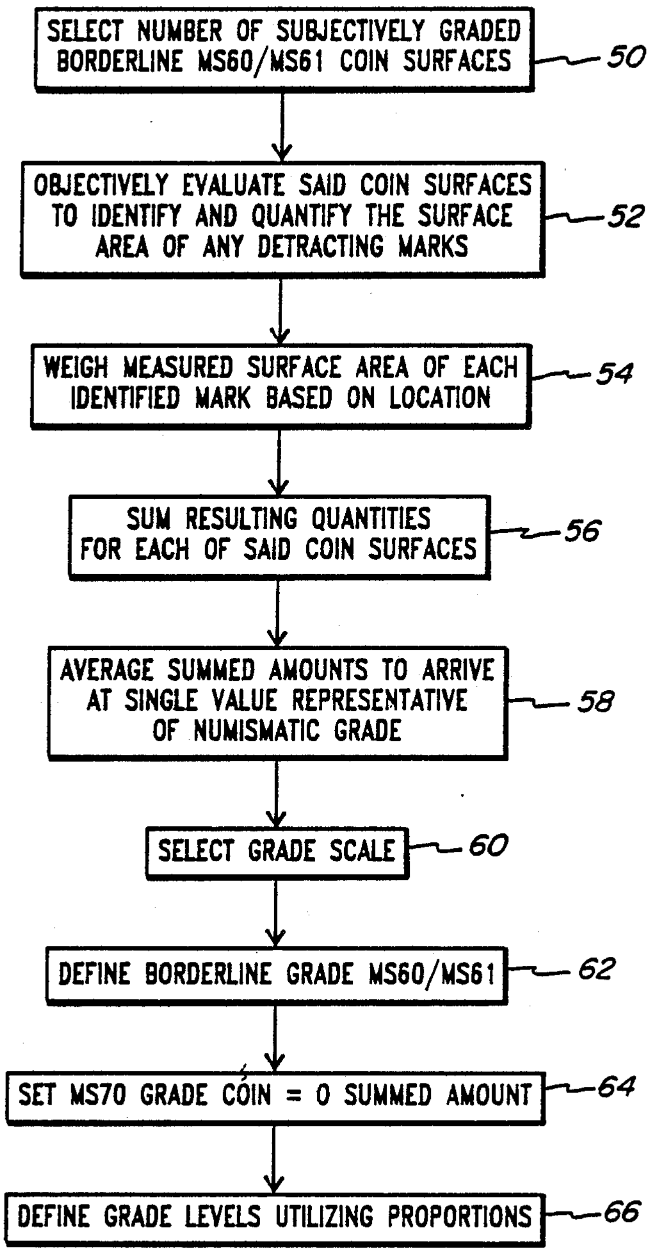
FIG. 3 illustrates one preferred method for defining the first reference database employed in the present inventon.

The preferred method for compiling the scaled database of quantified values correlated with numismatic grades will be described with reference to FIG. 3. Central to establishing this database is the objective evaluation of a number of subjectively graded coins of a particular grade category, such as coins subjectively graded to be MS60 or, preferably, borderline MS60/MS61. Thus, the first step is to select a number of such subjectively graded borderline MS60/MS61 coin surfaces for analysis, "Select Number of Subjectively Graded Borderline MS60/MS61 Coin Surfaces" 50. Each coin surface selected for objective evaluation at this point has ideally been independently subjectively graded by a number of numismatists to be of the chosen grade category, e.g., borderline MS60/MS61. Borderline MS60/MS61 coins are used in this example since it is believed easier to subjectively identify borderline coins than it is to subjectively identify a "dead center" coin of a particular grade category, such as MS60 or MS61.

The next step of the database defining process is to objectively evaluate, pursuant to the method of this invention described above and below, each selected coin surface to identify and quantify the surface area of any detracting marks thereon, "Objectively Evaluate Said Coin Surfaces to Identify And Quantify The Surface Area of Any Detracting Marks" 52. The measured surface area of each mark is then weighted based on the mark's location on the surface of the evaluated coin side, "Weight Measured Surface Area of Each Identified Mark Based On Location" 54, and the resulting quantities are summed for each coin side to arrive at an amount representative of both surface area and location of the detracting marks on each of the subjectively graded coin sides, "Sum Resulting Quantities For Each of Said Coin Surfaces" 56. The summed amounts are then averaged to arrive at a single quantified value or summed amount representative of the numismatic grade of such coins, i.e., borderline MS60/MS61, "Average Summed Amounts To Arrive At Single Value Representative of Numismatic Grade" 58. The actual value will obviously depend on, in addition to the measured surface area and location of the detracting marks, the system of measurement utilized and on the weighted significance given different areas of the obverse and reverse sides of the coin issue under evaluation.

After establishing a quantified value representative of a borderline MS60/MS61 grade coin, a grade scale for mint state coins must be selected, "Select Grade Scale" 60, so that the established quantified value may be equated with a specific grade, "Define Borderline Grade MS60/MS61", 62. As described below, the objective nature of the present invention is preferably advantageously utilized to assign very specific grades to evaluated coins. For example, this can be accomplished by providing 2, 10, 100, 500 or 1,000 qualifiers between each standard mint state grade (i.e., MS60, MS61, MS62, MS63, MS64, MS65, MS66, MS67, MS68, MS69 and MS70). Assuming two qualifiers are placed between standard mint state grades, e.g., by utilizing a plus/minus indication, a borderline MS60/MS61 coin can either be defined to represent an MS60+ or an MS61 coin. Alternatively, if there are 1,000 qualifiers between each standard grade level, the borderline MS60/MS61 could be defined, for example, as either an MS60+500 or an MS60+750 coin. The correlation of borderline MS60/MS61 coins to the selected objective grade scale will of necessity be an approximation since the borderline MS60/MS61 coins where subjectively defined at the start, i.e., step 50.

After equating the averaged quantified value with a particular grade, including qualifier if applicable, an MS70 grade coin is correlated with a 0 quantified value since an MS70 coin is perfect, having no detracting marks thereon, "Set MS70 Grade Coin=0 Summed Amount" 64. Once the quantified value for a specific grade, i.e., the grade correlated with a borderline MS60/MS61 coin, the high grade quantified value for an MS70 coin, and the number of grade categories, including qualifiers, are known, each grade level or category may readily be defined utilizing arithmetic proportions in a well known manner, "Define Grade Levels Utilizing Proportions", 66.

As noted above, an alternate starting point would be to select a number of subjectively graded MS60 coins for evaluation. Thus, a low grade quantified value would be established, i.e., MS60, using the above procedure. With a low grade quantified value and high grade quantified value, i.e., MS70, correlated for mint state coins, intermediate values corresponding to any number of intermediate grade categories, including qualifiers, may readily be calculated. For example, as shown in Table 1, quantified values may be computed to increase linearally between numismatic grade categories. This is accomplished by dividing the quantified value for the low MS60 grade coin (arbitrarily set at a value of 0.005480 for purposes of discussion) by 11, since there are 11 uncirculated or mint state categories presently in popular use, and either progressively subtracting the resultant value from the summed amount for the MS60 grade coin or adding the resultant value to the summed amount for the MS70 grade coin. Alternatively, if desired, quantified values may be correlated so as to vary in any selected manner between grade categories, that is, a disproportionate percentage of quantified values may reside within the MS60 to MS63 range when compared with the MS64 through MS70 range. For example, after a certain quality of coin grade is reached, such as MS64, other factors, such as mint luster, may be more important to the coin's value than the number and location of detracting marks thereon.

TABLE 1

| Numismatic Grade | Quantified Value (Summed Amount) |
|---|---|
| MS70 | .000000 |
| MS69 + 001 to MS69 + 1000 | .000547 to .000001 |
| MS69 | .000548 |
| MS68 + 001 to MS68 + 1000 | .001095 to .000549 |
| MS68 | .001096 |
| MS67 + 001 to MS67 + 1000 | .001643 to .001097 |
| MS67 | .001644 |
| MS66 + 001 to MS66 + 1000 | .002191 to .001645 |
| MS66 | .002192 |
| MS65 + 001 to MS65 + 1000 | .002739 to .002193 |
| MS65 | .002740 |
| MS64 + 001 to MS64 + 1000 | .003287 to .002741 |
| MS64 | .003288 |
| MS63 + 001 to MS63 + 1000 | .003835 to .003289 |
| MS63 | .003836 |
| MS62 + 001 to MS62 + 1000 | .004383 to .003837 |
| MS62 | .004384 |
| MS61 + 001 to MS61 + 1000 | .004931 to .004385 |
| MS61 | .004932 |
| MS60 + 001 to MS60 + 1000 | .005479 to .004933 |
| MS60 | .005480 |
| MS60 − 001 to Least Perfect Mint State Coin | .005481 to Maximum |

As shown in Table 1, numismatic grades reported pursuant to the present invention preferably include a plus factor, i.e., the +001 to +1000 qualifiers listed between each of the standard mint state grades (MS60–MS70). These factors or qualifiers increase the number of grade catagories available, and thus the exactness of the reported grade. If desired, grades could be reported with simply a plus/minus (+/−) indication, to triple the number of reportable grade catagories, or with a plus factor of any decimal place range, e.g., 1-10, 1-100, 1-500, 1-1000, etc. It is believed generally preferable, however, to advantageously utilize the objective and accurate nature of the present invention to report much more exact grades than presently available with subjective grading, e.g., through use of the 1-1000 range of intermediate grades illustrated in Table 1. This obviously facilitates a more accurate valuation of coins than now possible with 11 mint state grades.

Although construction of a database of values correlated to numismatic grades as illustrated in Table 1 is believed preferable, those skilled in the art will recognize that formulas can be devised for independently deriving the numismatic grade of a particular coin surface once the quantified value definitive of a particular coin grade, e.g., representative of an MS60 or borderline MS60/MS61 coin, highest quantified value, i.e., representative of an MS70 coin, and number of desired reportable grade catagories between MS60 and MS70 are known.

The second and third reference databases (surface wear and mint luster, respectively) are constructable in a manner similar to the first database. For example, as shown in FIG. 4 (an illustration of a magnified section of the relief of a coin under examination), wear generally comprises minute, multidirectional scratches of varying lengths and widths, which, under magnification, are susceptible to quantification, e.g., by number, length, severity, concentration, etc. Once quantified values are obtained for maximum and minimum readings (e.g., a maximum reading would be a subjectively evaluated maximum acceptable amount of surface wear for a coin still to be classified "mint state" and a minimum reading would be zero), they are correlated to a percentage scale, e.g., 0–100.

Figure 5B:
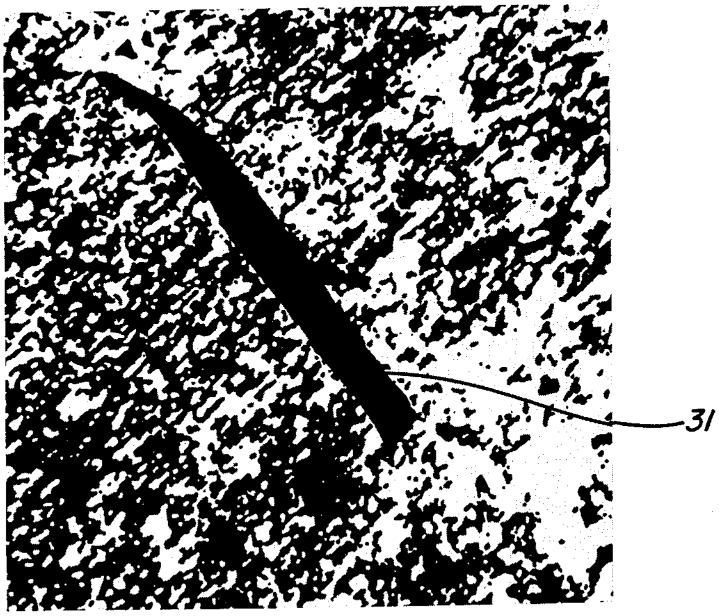
FIG. 5B is a representation of a magnified section of the surface of a test coin having a relatively low mint luster.

Similarly, the mint luster database can be constructed by microscopically analyzing the density of radial die markings formed by the flow of metal when the coin is struck. Different coin issues are recognized by numismatists to have different types of mint luster. Thus, an evaluation of radial die marking densities for a plurality of coins of each issue is required and the results are separately correlated with mint luster values from 0–100 percent. FIG. 5A is an illustration of the radial die markings present on a magnified coin surface exhibiting a high mint luster value, such as 75%, and FIG. 5B is a similar illustration of a die marking density for a coin exhibiting a relatively low mint luster value, such as 12%. The large mark 31 shown in FIG. 5B is a bag mark, which is included to illustrate the relative size of radial die markings to be quantified. The illustrations provided were produced at 200 magnification. If desired, greater or less magnification may be utilized for purposes of density valuation.

The fourth and fifth reference databases (strength of strike and artificial treatment information, respectively) simply comprise compilations of pertinent information required to understand the importance of measurements obtained from the obverse and/or reverse sides of the test coin. For example, for each coin issue to be evaluated, a strength of strike database is created and comprises known information on typical strength of strike values for a particular year and place of coining, thus allowing any measured exception to the norm to be identified and reported. Image analysis can be utilized to identify strength of strike exceptions by a number of methods, e.g., the degree of darkness created by the edges defining the relief of the coin or the sharpness of edges defining the coin relief can be evaluated and compared with similar information for a previously evaluated coin representative of a typical strength of strike for the particular coin issue being evaluated. The strike quality level could then be correlated to a generalized scale, such as weak, average, strong and exceptional. FIGS. 1A and 1B illustrate a weakly struck coin. Note, for example in FIG. 1B, that the ridges defining the word "Peace" on the reverse side of the coin are not clear and sharp, which is often indicative of a weakly struck coin.

The fifth reference database includes information on various surface conditions resulting from artificial treatment of a coin. The etching illustrated in FIG. 6, which is a magnified section of a coin surface, is caused by dipping a coin, and is clearly identifiable under magnification as rounded splotches. Similarly, a coin surface which has been buffed or whizzed is identifiable under magnification as having minute markings roughly in parallel, as illustrated in FIG. 7, unlike radial die markings which tend to radiate from a certain point.

Figure 8A:
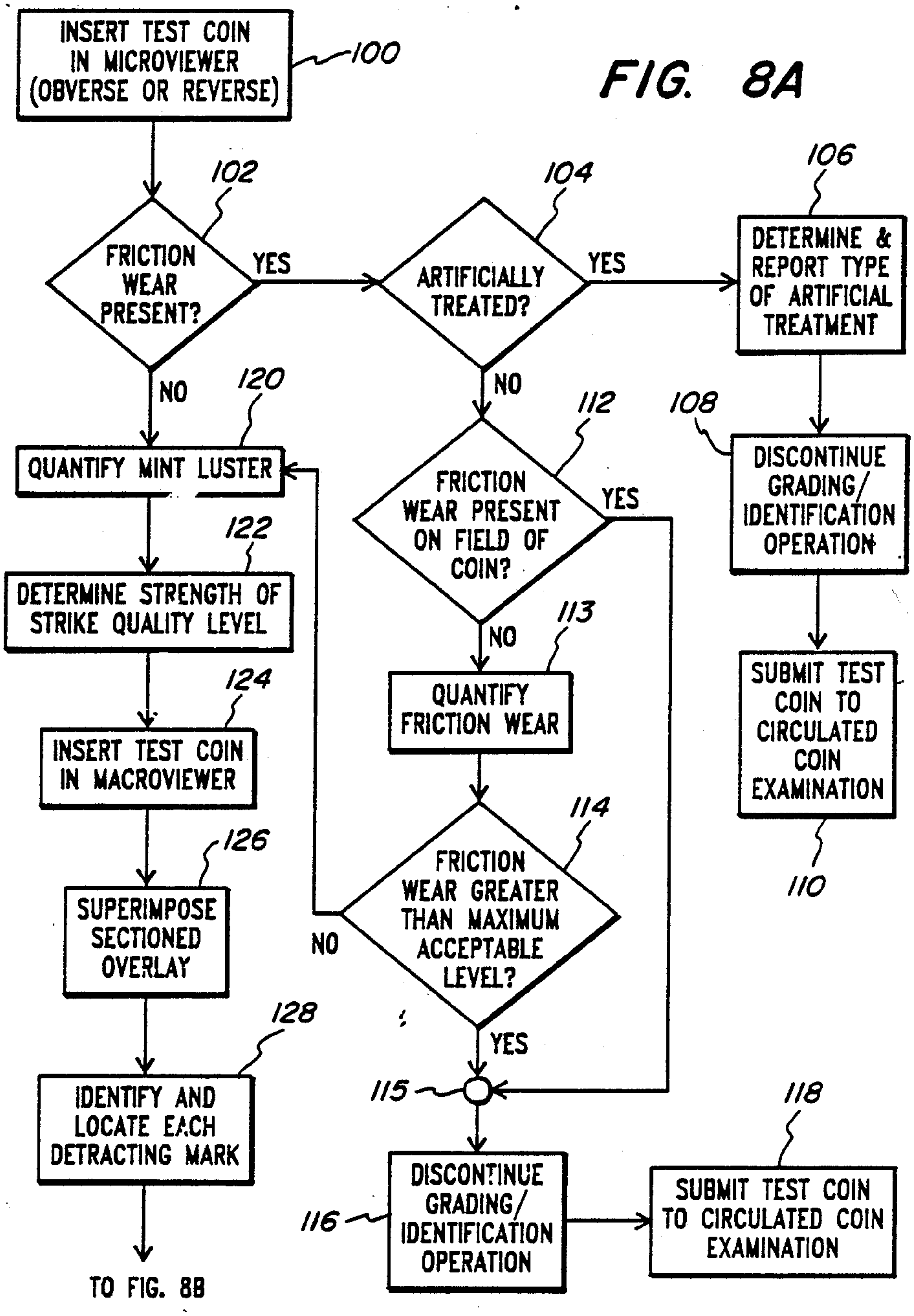
FIGS. 8A, 8B and 8C are flow diagrams of one functional embodiment of the present invention.
Figure 8B:
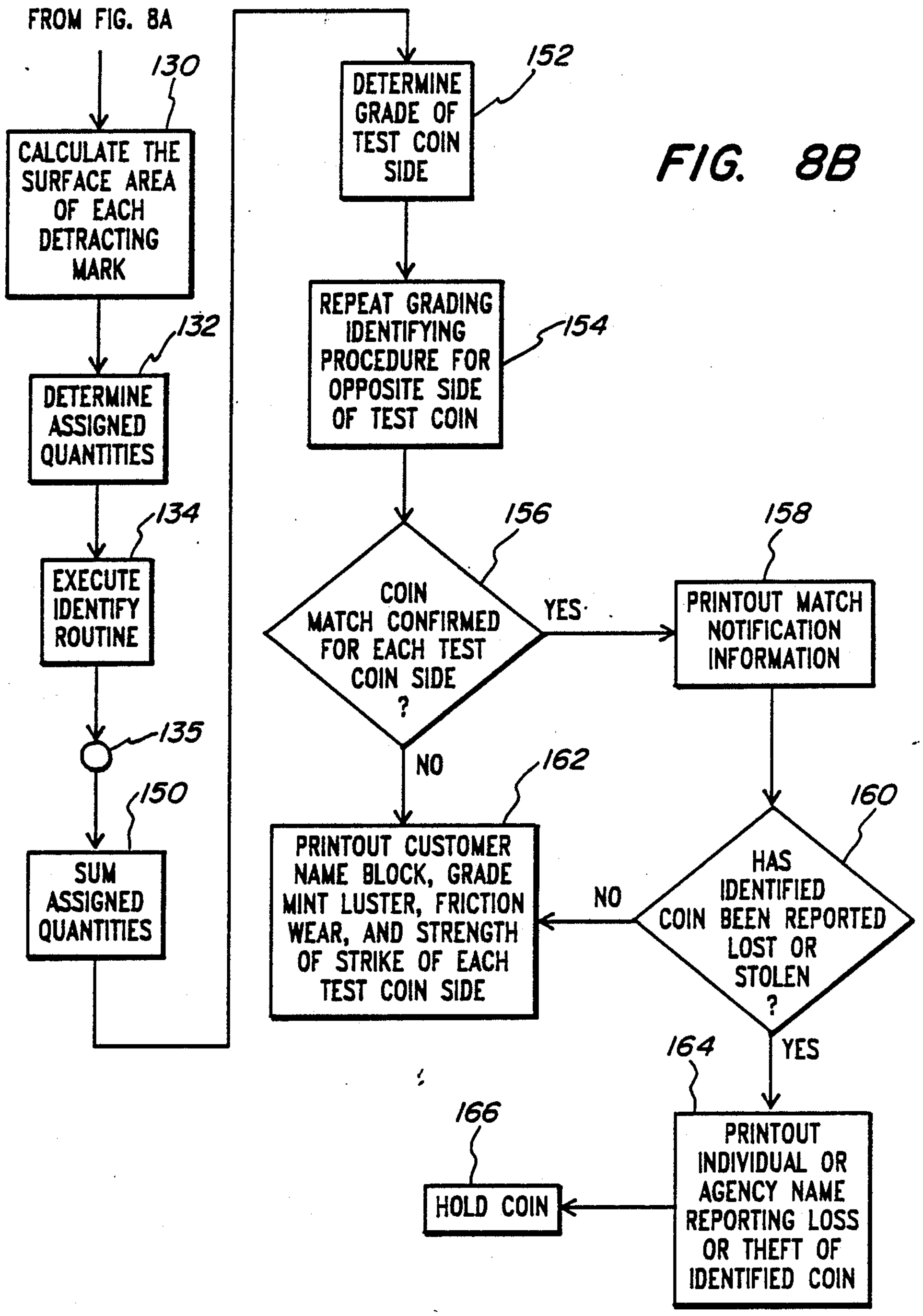
Figure 8C:
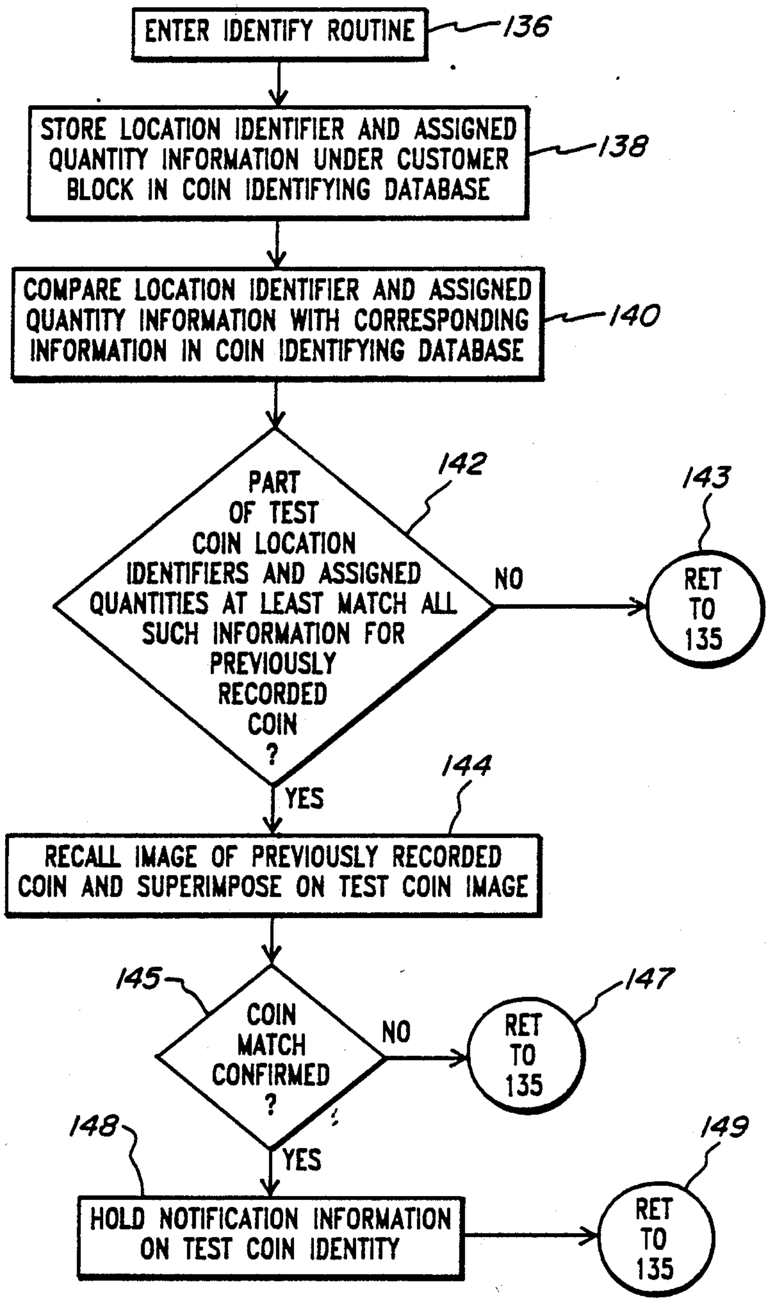

The operation of the present invention can be better understood with reference to the specific functional embodiment illustrated in the instructions and inquiries comprising the flowcharts of FIGS. 8A, 8B & 8C, charts which are capable of being programed by one of ordinary skill in the art. Referring first to FIG. 8A, flow begins at 100, "Insert Coin In Microviewer (Obverse or Reverse)," wherein the test coin to be graded, fingerprinted and/or identified is inserted into the microviewer with either the obverse or reverse side positioned for analysis. From 100, flow is to inquiry 102 "Friction Wear Present?", and if "yes", to inquiry 104 "Artificially Treated?". If the answer to inquiry 104 is positive, meaning the test coin preferably fails to qualify as uncirculated, flow is to instruction 106 "Determine and Report Type of Artificial Treatment." Once treatment type is reported, grading and/or identification operations are discontinued, "Discontinue Grading-/Identification Operation" 108, and the operator is instructed to submit the coin for examination pursuant to a separate circulated coin program, "Submit To Circulated Coin Examination," 110.

Returning to inquiry 104, if treatment of the coin is not detected, flow is to instruction 111 to inquiry 112 "Friction Wear Present On Field of Coin?". In the preferred embodiment, friction wear on the field of the coin is definitive of a circulated coin and thus with a "yes" response flow is through junction 115 to instruction 116 "discontinue Grading/Identification Operation". The test coin is thereafter submitted for circulated coin examination, "Submit Test Coin to Circulated Coin Examination" 118. If the answer to inquiry 112 is "no", then flow is to instruction 113 "Quantify Friction Wear," and hence to inquiry 114, "Friction Wear Greater Than Maximum Acceptable Level?". This inquiry arises from the difficulty encountered with coins subjectively graded to be within, for example, the AU50 or higher range but exhibiting some sign of friction wear on a relief surface, so called "slider coins." Such a coin could be classified in the "mint state" categories if the friction wear was caused by contact with a canvas coin bag, or in the "almost uncirculated" categories if it was caused by pocket wear or cabinet friction, i.e., wear indicative of circulation. Whatever the cause, even under magnification surface wear is subject to different interpretations by different appraisers. Thus, one optional feature or step of this invention is to determine an acceptable, maximum quantified friction wear level, e.g., based on the density of scratches on coins falling within the AU50 or above grade categories, coins which should only be lightly scratched at most. Upon detecting a coin exhibiting a quantified wear level greater than zero but at or below said maximum, the standard alphabetical AU or MS prefix will be omitted from the reported grade, thus signifying that the coin could be either uncirculated or circulated, and it is left to the appraiser to adjust its value accordingly.

Returning to the flowchart, if friction wear is quantified to be greater than said maximum level, which as noted would be indicative of a coin below the AU50 grade category, then flow is to instruction 116, "Discontinue Grading/Identification Operation." From instruction 116, the operator is directed to the circulated grading and/or identifying routine via instruction 118, "Submit To Circulated Coin Examination."

Should the amount of friction wear be within acceptable levels, then flow from inquiry 114 is to instruction 120 "Quantify Mint Luster." If no friction wear had initially been detected at inquiry 102, flow would have proceeded directly to instruction 120. After mint luster has been quantified, the computer is directed to instruction 122 "Determine Strength of Strike Quality Level" of the coin, which, once computed, completes the microexamination of the selected coin surface.

Figure 9:
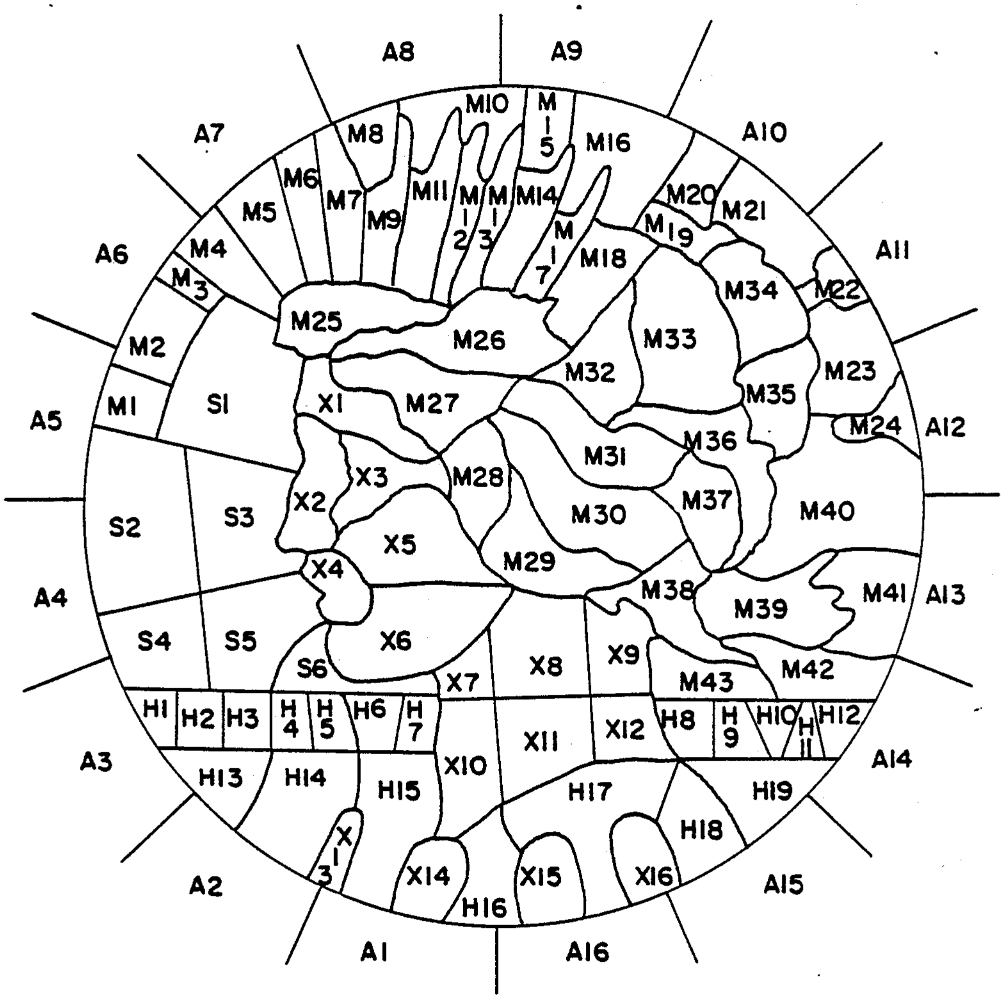
FIG. 9 is a specially configured, sectioned overlay to be superimposed upon the obverse side of the test coin to be graded.

After instruction 122, flow is to instruction 124, "Insert Test Coin In Macroviewer," with the same side positioned for evaluation. From instruction 124, flow is to instruction 126 "Superimpose Sectioned Overlay." FIG. 9 is an example of one sectioned overlay specially configured for the obverse side of the particular coin issue being tested. Superimposition of the overlay may either be manual or, preferably, computer generated, whether operator visible or latent. Together the various sectioned locations, designated in the illustration by alphanumeric characters A1–A16, H1–H19, M1–M43, S1–S6 and X1–X16, total one hundred. Obviously, if desired, the overlay could be further divided into a greater number of sectioned areas or could be constructed with a smaller number of sectioned areas. The number of distinct or sectioned areas need only be large enough such that the location of any detracting mark on the surface of the coin is well established for purposes of "fingerprinting" the coin, e.g., only three separate sectioned areas would probably not be sufficient to accomplish this object. In addition, the sectioned areas could alternately be assigned alphabetical or numerical identifiers, and there could be a plurality of overlays definitive of sections of the coin surface, e.g., each of the sectioned locations illustrated in FIG. 9 could be defined by a separate overlay. If multiple overlays are employed, it is believed preferable that they be computer generated.

As already noted, the sectioned overlay is specially configured such that the various areas thereof correspond with the surface design of the particular side of the coin under evaluation. This allows different locations on the coin surface to be easily weighted in importance such that the detracting significance of a particular mark can be readily computed based in part upon its location on said coin surface. For example, within the illustrated overlay, areas with the alpha prefix of "A" may be accorded a value of one, "H" a value of two, "M" a value of four, "S" a value of six, and "X" a value of eight.

Alternatively, if desired, two sectioned overlays could be utilized. One overlay could be divided into several different areas, e.g., four to six, specially designed and weighted in importance based upon the coin surface under examination, and the other sectioned overlay could comprise a detailed grid capable of providing exact detracting mark location information for purposes of fingerprinting or identifying of the coin, e.g., a grid of close horizontal and vertical lines. An overlay such as that illustrated in FIG. 9 is believed preferable, however, since it combines the functions of facilitating assignment of higher or lower values to marks based upon their location on the coin surface and also the assignment of relatively exact position identifying information to marks for purposes of fingerprinting the coin.

Figure 10:
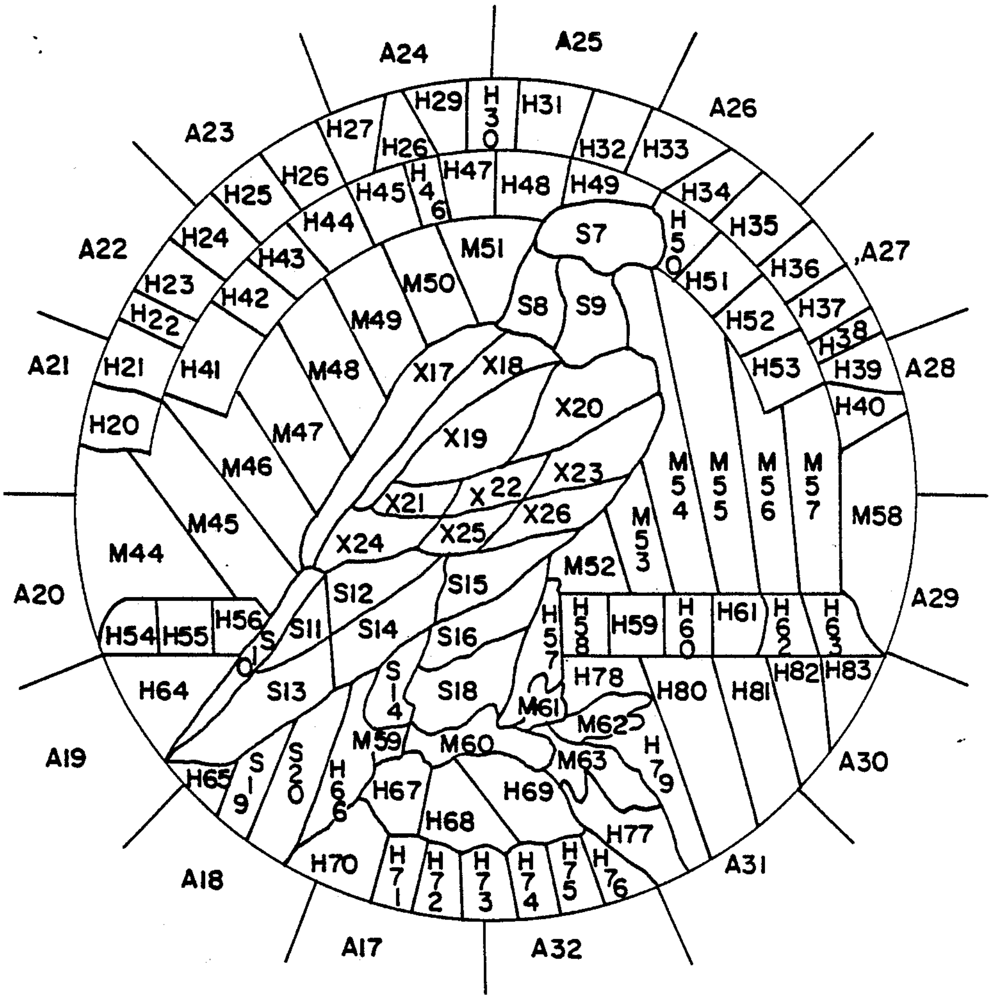
FIG. 10 is a specially configured, sectioned overlay to be superimposed upon the reverse side of the test coin to be graded.

An example of a sectioned overlay for the reverse side of the test coin 11 is provided in FIG. 10. As shown, the reverse side overlay is divided into 124 different areas labeled A17–A32, H20–H83, M44–M63, S7–S20 and X17–X26. The alphanumeric prefixes can indicate weighting values the same or different as for the obverse side of the test coin. Again, the design and/or number of locations in the pattern can be varied if desired, or two overlays can be utilized as described for the obverse side of the coin.

After superimposing the sectioned overlay, the computer is directed, using the system described herein, to "Identify and Locate Each Detracting Mark" 128, on the surface of the test coin under evaluation. From instruction 12B, flow is to FIG. 8B and instruction 130, "Calculate the Surface Area of Each Detracting Mark." After determining surface area, an assigned quantity for each mark is computed, "Determine Assigned Quantities" 132. As used herein, "assigned quantity" means the measured surface area of a detracting mark multiplied by the value associated with the alpha prefix of the sectioned area wherein the mark is located, i.e., either one, two, four, six or eight in the example illustrated in FIGS. 9 and 10. Tables 2 and 3 contain sample data on the detracting marks 14, 14', 14", and 16, 16', 16" illustrated on the obverse and reverse sides of test coin 11, respectively, in FIGS. 1A and 1B.

TABLE 2

| MARK REFERENCE NUMERICAL | LOCATION IDENTIFIER | SURFACE AREA QUANTIFICATION (1/1000") | | LOCATION FACTOR | | ASSIGNED QUANTITY |
|---|---|---|---|---|---|---|
| 14 | S2 | .000239 | X | 6 | = | .001434 |
| 14' | A12 | .000103 | X | 1 | = | .000103 |
| 14" | (H15 | .000026 | X | 2 | = | .000052) |
| | (X10 | .000035 | X | 8 | = | .000280) |
| | H15/X10 | | | | | .000332 |
| | | | SUMMED AMOUNT | | = | .001869 |

(Values arbitrarily chosen for purposes of illustration)

TABLE 3

| MARK REFERENCE NUMERICAL | LOCATION IDENTIFIER | SURFACE AREA QUANTIFICATION (1/1000" | | LOCATION FACTOR | | ASSIGNED QUANTITY |
|---|---|---|---|---|---|---|
| 16 | M44/ M45 | .000325 | X | 4 | = | .001300 |
| 16' | X19 | .000281 | X | 8 | = | .002284 |
| 16" | X19 | .002368 | X | 8 | = | .002368 |
| | | | SUMMED AMOUNT | | = | .005916 |

(Values arbitrarily chosen for purposes of illustration)

As reported in Table 2, and with reference to FIGS. 1A and 9, mark 14 is located within sectioned area S2 and has a quantified surface of 0.000239 reported in units of 1/1000 of an inch. Obviously, the unit of measurement can be changed, e.g., to metric, if desired. An assigned quantity is calculated for mark 14 by multiplying the "S" location factor of 6 by the measured surface area of the mark. The process is again repeated for each of the remaining marks 14' and 14" on the obverse surface of test coin 11. Special consideration must be given to mark 14" since it overlaps sectioned areas of different detracting significance, i.e., an "H" and an "X" area. One method of standardizing the reporting of a mark overlaping two different areas can be obtained by reading the mark from that end closest to the edge of the coin. (Alternatively, the program could be written such that a detracting mark in multiple areas is reported from that area having the alphabetically lowest prefix to the highest prefix, and, if the mark is located within areas of the same alpha character, then from lowest numerical suffix to highest numerical suffix). Thus, mark 14" is read H15/X10 and a single assigned quantity is preferably computed therefore. Note that this procedure of identifying a mark in its entirety rather than segregating it into various parts provides a more accurate reporting of the unique fingerprint of the test coin. Although for purposes of grading it is not necessary to combine the information into a single assigned quantity, e.g., the mark can simply be reported as multiple assigned quantities, for purposes of fingerprinting the combined listing is believed to provide a more accurate indication of a coin's identity. For example, with a single assigned quantity for each mark, one mark overlapping two areas will not be inadvertently read to be two marks.

As reported in Table 3, on the reverse side of test coin 11 mark 16 overlaps two sectioned areas having the same location factor, i.e., M44 and M45, such that assigned quantity information is readily reported as a single entry, but as above, location is reported as a combination of two identifiers. Marks 16' and 16" are located within the same sectioned area, however because the marks are distinct, they are independently reported, which again is necessary to accurately fingerprint the coin.

After computing assigned quantities for each identified detracting mark, the computer is directed to "Execute Identify Routine," 134. One embodiment of such a routine is depicted in FIG. 8C.

As shown, flow enters the routine at 136, "Enter Identify Routine" and proceeds to instruction 138, "Store Location Identifier and Assigned Quantity Information Under Customer Name Block in Coin Identifying Database." The customer name block includes, e.g., appropriate client identifying information such as date of grading, year of coining, etc. The coin identifying database for a particular coin issue will be generated as of the initial fingerprinting of a coin and exist for, and expand with, all subsequent coins of the same issue which are fingerprinted. Once the information is stored, the computer is directed to "Compare Location Identifier and Assigned Quantity Information With Corresponding Information In Coin Identifying Database," 140. From 140, flow proceeds to inquiry 142, "Part of Test Coin Location Identifiers and Assigned Quantities at Least Match All Such Information for Previously Recorded Coin?" The test coin location identifiers and assigned quantities need only partially match all such corresponding information for a previously recorded coin since additional detracting marks may have been inadvertently or intentionally added to the surface of the coin under examination subsequent a previous fingerprinting examination. If the answer to inquiry 142 is "no", meaning the coin has not been previously objectively fingerprinted, flow returns 143 "RET" to the main routine at junction 135. If "yes", flow proceeds to optional instruction 144, "Recall Image of Previously Recorded Coin and Superimpose on Test Coin Image," 145, and, thereafter, to inquiry 146 "Coin Match Confirmed?". This procedure is designed to allow for independent confirmation by the operator that a match has indeed been identified. If the answer to inquiry 146 is "no", flow is directed to return 147 "RET" to the main routine at junction 135. If "yes," flow proceeds to instruction 148, "Hold Notification Information on Test Coin Identity," and hence to return 149 "RET" to the main program at junction 135.

From junction 135, the computer is directed to instruction 150 "Sum Assigned Quantities" to obtain a single "quantitative value" or "summed amount" representative of the surface area of all detracting marks thereon weighted by each mark's respective location on the surface of the coin. The summed amount is then compared against the first reference database, i.e., the database of values representative of numismatic grades discussed above, instruction 152, "Determine Grade of Test Coin Side." This step could include weighting of the summed amount in view of the quantified mint luster and/or measured strength of strike. As described above, the summed amount is correlated into a numismatic grade by referring to the first reference database of values. After determining the grade of the side under evaluation, the computer is directed to "Repeat Grading/Identifying Procedure for Opposite Side of Test Coin," 154. The summed amounts for the obverse and reverse sides of the test coin illustrated in FIGS. 1A and 1B which are reported in Tables 2 and 3 to be 001869 and 0.005916, respectively, translate with reference to the numbers of Table 1, into a numismatic grade of MS66+580 for the obverse side and MS60−793 for the reverse side. As presented, these figures do not take into account the measured mint luster and/or strength of strike values for the test coin of FIGS. 1A and 1B, however, they could easily be adjusted to include such values if desired. Friction wear has been included since wear falls within the definition of detracting marks as set forth above.

Assuming the opposite side of the test coin does not reveal evidence of artificial treatment or contain an amount of friction wear greater than the maximum acceptable level, in which case evaluation of the coin side would be discontinued as described above, flow proceeds to inquiry 156, "Coin Match Confirmed for Each Test Coin Side?" and if "yes" to instruction 158, "Print Match Notification Information," including the previously recorded owner and date of previous grading/identifying operation." From instruction 158 flow is to inquiry 160, "Has Identified Coin Been Reported Lost or Stolen?" If "no," the computer is directed to "Printout Customer Name Block, Grade, Mint Luster, Friction Wear and Strength of Strike Values for Each Test Coin Side," 162. If the answer is "yes" at inquiry 160, the computer is directed at instruction 164 to "Printout Individual or Agency Name Reporting Loss or Theft of Identified Coin." The identified coin is then held 166 "Hold Coin" for appropriate authorities if such action is warranted. Lastly, returning to inquiry 156, if the answer is "no", flow is directly to instruction 162.

It will be observed from the above that this invention fully meets the objectives set forth herein. A system for truly objectively assigning a numismatic grade to a test coin is provided. In addition, the system is capable of being used to objectively fingerprint and identify a lost or stolen coin, preferably including routine examination of each coin for purposes of identification. Lastly, it will be noted that the system disclosed is relatively easy to implement and clearly less expensive to operate then heretofore known grading systems or methods.

Although several embodiments have been illustrated in the accompanying drawings and described in the foregoing detailed description, it will be understood that the invention is not limited to the particular embodiments discussed but is capable of numerous rearrangements, modifications and substitutions without departing from the scope of the invention. The following claims are intended to encompass all such modifications.

I claim:

1. An automated method for objectively assigning a numismatic grade to a test coin of particular issue, said method comprising the steps of:

(a) electronically identifying and locating each detracting mark on one of the obverse and reverse sides of the test coin;

(b) electronically measuring the surface area of each identified detracting mark;

(c) utilizing computer means to automatically assign to each identified detracting mark a quantity proportional to the detracting significance thereof based upon the location and measured surface area of the mark on said one side of the test coin;

(d) automatically summing said assigned quantities using said computer means to arrive at an amount representative of all identified detracting marks on said one side of the test coin;

(e) automatically correlating said summed amount into a numismatic grade for said one side of the test coin with reference to a preexisting computer database of scaled values representative of numismatic grades; and (f) repeating steps (a)-(e) for the opposite side of the test coin.

2. The method of claim 1, further comprising the step of:

(g) using said computer means to average the numismatic grades for the obverse and reverse sides of the test coin to obtain a single numismatic grade for said coin.

3. The method of claim 1, wherein locating of each detracting mark in step (a) includes superimposing a sectioned overlay on said one side of the test coin.

4. The method of claim 1, wherein locating of each detracting mark in step (a) includes superimposing a sectioned overlay on said one side of the test coin specifically configured for said coin side.

5. The method of claim 4, wherein said sectioned overlay is coded to indicate areas of greater and lesser importance on the surface of the coin and said coding is utilized in said step (c) by said computer means to assign a quantity proportional to the detracting significance of each identified mark on said coin surface.

6. The method of claim 1, wherein locating of each detracting mark in step (a) includes superimposing a plurality of sectioned overlays on said one side of the test coin, each of said overlays being specifically configured for a different area of said coin side surface.

7. The method of claim 1, wherein said correlating step (e) includes automatically translating said summed amount into a standard numismatic grade and a plus factor.

8. The method of claim 7, wherein said standard numismatic grade includes a whole number and said plus factor is a decimal fraction of at least one place.

9. The method of claim 8, wherein said plus factor is a decimal fraction of three places.

10. The method of claim 1, further comprising the step of:

(h) electronically comparing the identified location and measured surface area of each detracting mark on each side of the test coin with a coin identifying computer database of detracting mark location and surface area information for the given coin issue and providing an indication when at least part of the test coin detracting mark location and surface area information matches all such information in said database for a particular, previously recorded coin, hereby indicating identity of the test coin and said particular coin.

11. The method of claim 10, further comprising the step of:

(i) storing said test coin detracting mark location and surface area information in said coin identifying computer database for subsequent retrieval and comparison with other coins.

12. The method of claim 11, further comprising the step of:

(j1) generating a computer image of each side of the test coin; and (j2) storing said computer images of the test coin sides for subsequent retrieval and comparison with other coin images, whereby said computer images provide means for cross-checking an indication of coin identity provided in said comparing step (h).

13. The method of claim 10, wherein said comparing step (h) comprises electronically comparing said quantities assigned to each detracting mark with a coin identifying computer database of such detracting mark assigned quantities for coins of the given issue and providing an indication when at least part of the test coin detracting mark quantities matches all such quantities in the database for a particular, previously recorded coin, thereby indicating identity of the test coin and said particular coin.

14. The method of claim 13, further comprising the step of:

(k) storing said test coin assigned quantities in said coin identifying computer database for subsequent retrieval and comparison with other coins.

15. The method of claim 14, further comprising the steps of:

(l1) generating a computer image of each side of the test coin; and (l2) storing said computer images of the test coin sides for subsequent retrieval and comparison with other coin images, whereby said stored computer images provide means for cross-checking an indication of coin identity provided in said comparing step (h).

16. The method of claim 1, further comprising the step of:

(m) electronically microscopically evaluating the mint luster of each test coin side and utilizing said computer means to adjust the corresponding numismatic grade of each side based upon the extent of mint luster present on said side.

17. The method of claim 16, wherein said mint luster evaluating step (m) includes:

automatically selecting at least one location on each side of the test coin and microscopically examining the surfaces of the coin at said locations;

quantifying the radial die marks at said selected locations using said computer means; and automatically correlating said quantified radial die mark information for each coin side into an adjustment of said numismatic grade for said side, thereby making the grade of each coin side dependent upon the amount of mint luster thereon.

18. The method of claim 1, further comprising the step of:

(n) electronically microscopically analyzing the test coin for evidence of tampering and providing an indication when tampering is detected.

19. The method of claim 18, further comprising the step of:

(o) determining the type of artificial treatment if tampering is detected and providing an indication of said treatment type.

20. The method of claim 19, wherein said tamper detection step (o) includes automatically selecting at least one location on each side of the coin microscopically examining the surface of the coin at said locations.

21. The method of claim 19, further comprising the step of:

(p) utilizing said computer means to automatically adjust downward the numismatic grade of each test coin side on which evidence of tampering is detected.

22. The method of claim 1, further comprising the step of:

(q) initially generating said preexisting computer database of scaled values representative of numismatic grades.

23. The method of claim 22, wherein said database generating step (q) includes:

(r) selecting a multiple of coin sides subjectively graded to be within a certain grade category;

(s) repeating steps (a)–(d) for each of said selected coin sides;

(t) using said computer means to average the assigned quantities derived for each selected coin side to arrive at a single assigned quantity value representative of said coin sides;

(u) automatically ascribing to the highest grade category, representative of a perfect coin, an assigned quantity value of zero; and (v) electronically generating a computer database of assigned quantities correlated with specific numismatic grades using proportional arithmetic, said assigned quantity representative of said certain grade category and said assigned quantity representative of said high grade category.

24. The method of claim 23, further comprising the step of:

(w) initially defining the numismatic grades to be correlated with assigned quantities.

25. The method of claim 1, further comprising the step of:

(x) automatically electronically microscopically analyzing the relief on each of the obverse and reverse sides of the test coin for surface wear.

26. The method of claim 1, further comprising the steps of:

electronically evaluating the strength of strike of each of the obverse and reverse sides of the test coin;

electronically determining the year date and location of coining of said test coin; and automatically comparing said test coin strength of strike information with a preexisting computer database of such strength of strike information for coins of the same issue to determine whether there is deviation in said test coin strike information which should effect the numismatic grade of said coin.

27. An automated method for accurately and objectively identifying a test coin of a particular issue via reference to a preexisting computer database of coin identifying, detracting mark location and surface area information for coins of said issue, said method comprising the steps of:

(a) electronically identifying and locations each detracting mark on both the obverse and reverse sides of the test coin;

(b) electronically measuring the surface area of each identified detracting mark;

(c) using computer means to automatically compare the location and surface area of each detracting mark with the database of detracting mark location and surface area information; and (d) automatically providing an indication when at least part of the test coin detracting mark location and surface area information matches all such information for a particular, previously recorded coin, thereby indicating identity of the test coin and said particular coin.

28. The method of claim 27, further comprising the step of:

(e) automatically storing said test coin detracting mark location and surface area information in said coin identifying computer database for subsequent retrieval and comparison with other coins.

29. The method of claim 27, further comprising the steps of:

(f1) generating a computer storable image of each side of the test coin; and (f2) storing the computer images of the test coin sides for subsequent retrieval and comparison with other coin images, whereby said stored computer images provide means for cross-checking an indication of coin identity provided in said step (d).

30. The method of claim 27, wherein locating of each detracting mark in step (a) includes automatically superimposing at least one detailed sectioned overlay on said one side of the test coin.

31. The method of claim 27, wherein locating of each detracting mark in step (a) includes automatically superimposing at least one specially configured computer generated sectioned overlay on said one side of the test coin.

32. An automated method for objectively analyzing a test coin of a given issue, said method comprising the steps of:

(a) electronically macroscopically evaluating the obverse and reverse sides of the test coin identify, locate, and quantify the surface area of each detracting mark thereon;

(b) using computer means to automatically assign to each identified detracting mark on one of the obverse and reverse sides of the test coin a quantity proportional to the detracting significance of a mark based upon its location and measured surface area;

(c) automatically summing said assigned quantities using said computer means to arrive at an amount representative of all detracting marks on said test coin side;

(d) automatically translating said summed amount into a numismatic grade;

(e) repeating steps (b)-(d) for the opposite side of the test coin;

(f) electronically microscopically evaluating the obverse and reverse sides of the test coin to quantify the mint luster of each side and to detect any artificial treatment of the coin; and (g) automatically providing separate listings of evaluated information for the obverse and reverse sides of the test coin.

33. The method of claim 32 wherein said translating step (d) is accomplished with reference to a preexisting computer database of scaled values representative of numismatic grades.

34. The method of claim 33, further comprising the step of:

(h) initially generating said scaled database of values representative of numismatic grades.

35. The method of claim 32, further comprising the steps of:

(i) electronically evaluating the strength of strike of each test coin side; and (j) using said computer means to automatically adjust said summed amount of step (c) by said quantified mint luster and strength of strike values such that said numismatic grades of step (e) are representative of said measured detracting marks, mint luster and strength of strike values.

36. The method of claim 32, wherein said translating step (d) includes translating each of said summed amounts into a standard numismatic grade and a plus factor.

37. The method of claim 36, wherein said standard numismatic grade includes a whole number and said plus factor is a decimal fraction of at least one place.

38. The method of claim 32, wherein said listing step (g) includes automatically providing a separate listing for each test coin side of the numismatic grade, mint luster, and, if detected, an indication of artificial tampering thereof.

39. The method of claim 32, further comprising the step of:

(k) automatically averaging the numismatic grades for the obverse and reverse sides of the test coin using said computer means to obtain a single numismatic grade for said coin.

40. The method of claim 39, wherein said listing step (g) includes providing a listing of said average numismatic grade.

41. The method of claim 32, wherein said microscope evaluating step (f) includes electronically analyzing at least two separate locations on each of the obverse and reverse sides of the test coin to quantify the mint luster of said sides.

42. The method of claim 41, wherein said microscope evaluating step (f) includes:

(l) electronically quantifying radial die marks at said at least two locations on one of the obverse and reverse sides of the coin;

(m) averaging said quantified radial die mark information for said coin side using said computer means;

(n) automatically correlating said average quantified information into a mint luster value for said coin side with reference to a preexisting database of mint luster values; and (o) repeating steps (l)-(n) for the opposite side of the coin.

43. The method of claim 42, further comprising the step of:

(p) automatically adjusting the summed amount derived in step (c) for each of the obverse and reverse sides of the test coin based upon the respective side's mint luster value such that after translating said summed amounts into numismatic grades said grades are representative in part of said mint luster values.

44. The method of claim 36, wherein the assigned standard grades include values from AU50 through MS70.

45. The method of claim 44, wherein the microscope evaluating step (f) further includes electronically analyzing the relief on each of the obverse and reverse sides of the coin for surface wear.

46. The method of claim 45, further comprising the step of:

(q) automatically modifying the standard numismatic grade by reporting only the numerical value thereof when the grade of one of the obverse and reverse sides of the test coin is above AU50 and evidence of surface wear is detected on said side.

47. An automated system for objectively assigning a numismatic grade to a test coin of a given issue, said system comprising:

macroscopic imaging means for electronically identifying and locating each detracting mark on each of the obverse and reverse sides of the test coin;

first computer means for automatically computing the surface area of each identified mark and for assigning a quantity representative of the detracting significance of each mark based upon its location on one of the obverse and reverse sides of the test coin and its measured surface area; and second computer means for separately summing the quantities assigned to each identified mark on the obverse and reverse sides of said coin and for translating said summed amounts into numismatic grades for said test coin sides.

48. The system of claim 47, further comprising:

microscopic imaging means for electronically evaluating and quantifying the mint luster of each of the obverse and reverse sides of the test coin.

49. The system of claim 48, wherein said microscopic imaging means includes electronic means for analyzing said coin sides to detect whether said coin has been artificially treated.

50. The system of claim 49, wherein said macroscopic imaging means includes:

a macroviewer capable of forming optical images of the obverse and reverse side surfaces of the test coin; and a scanner for converting the optical images of the test coin surfaces into video signals capable of being computer analyzed.

51. The system of claim 50, wherein said microscope imaging means includes a microviewer which forms a magnified optical image of the obverse and reverse side surfaces of the test coin, and wherein said scanner converts said magnified optical images of the test coin surfaces into video signals capable of being computer analyzed.

52. The system of claim 51, wherein said first computer means includes image analysis means for computing the surface area of each identified mark and for generating said assigned quantities representative of the detecting significance of said identified marks.

53. The system of claim 52, wherein said macroscopic imaging means includes means for automatically superimposing sectioned overlays on the obverse and reverse sides of the test coin specifically configured for each of said test coin sides.

54. The system of claim 53, wherein said second means for translating includes means for correlating said summed amounts into numismatic grades with reference to a preexisting scaled database of values representative of numismatic grades.

55. The system of claim 54, further comprising:

electronic identifying means for comparing the identified location and measured surface area of each detracting mark on each side of the test coin with a coin identifying computer database of detracting mark location and surface area information for the given coin issue and automatically providing an indication when at least part of the test coin detracting mark location and surface area information matches all such information in the database for a particular, previously recorded coin, thereby indicating identity of the test coin and said particular coin.

56. The system of claim 55, further comprising means for storing the test coin detracting mark location and surface area information in said coin identifying computer database for subsequent retrieval and comparison with other coins.

57. The system of claim 56, further comprising means for generating and storing a computer image of each side of the test coin for subsequent retrieval and comparison with other coin images.

* * * * *

UNITED STATES PATENT AND TRADEMARK OFFICE

CERTIFICATE OF CORRECTION

PATENT NO. : 4,899,392

DATED : February 6, 1990

INVENTOR(S) : Merton, Henry A.

It is certified that error appears in the above-identified patent and that said Letters Patent is hereby corrected as shown below:

Column 11, line 35, delete "to instruction 111"
Column 15, line 30, substitute --0.001869-- for "001869".
Column 15, line 33, substitute --589-- for "580".
Column 17, line 14, substitute --thereby-- for "hereby".
Column 18, line 18, insert --and-- between "coin" and "microscopi-".
Column 19, line 11, substitute --locating--for "locations".
Column 19, line 54, insert --to-- between "coin" and "identify".
Column 20, line 55, substitute --microscopic-- for "microscope".
Column 21, line 13, substitute --microscopic-- for "microscope".
Column 22, line 18, substitute --detracting-- for "detecting".

Signed and Sealed this

Twenty-first Day of July, 1992

*Attest:*

DOUGLAS B. COMER

*Attesting Officer* — *Acting Commissioner of Patents and Trademarks*